Figure 1:
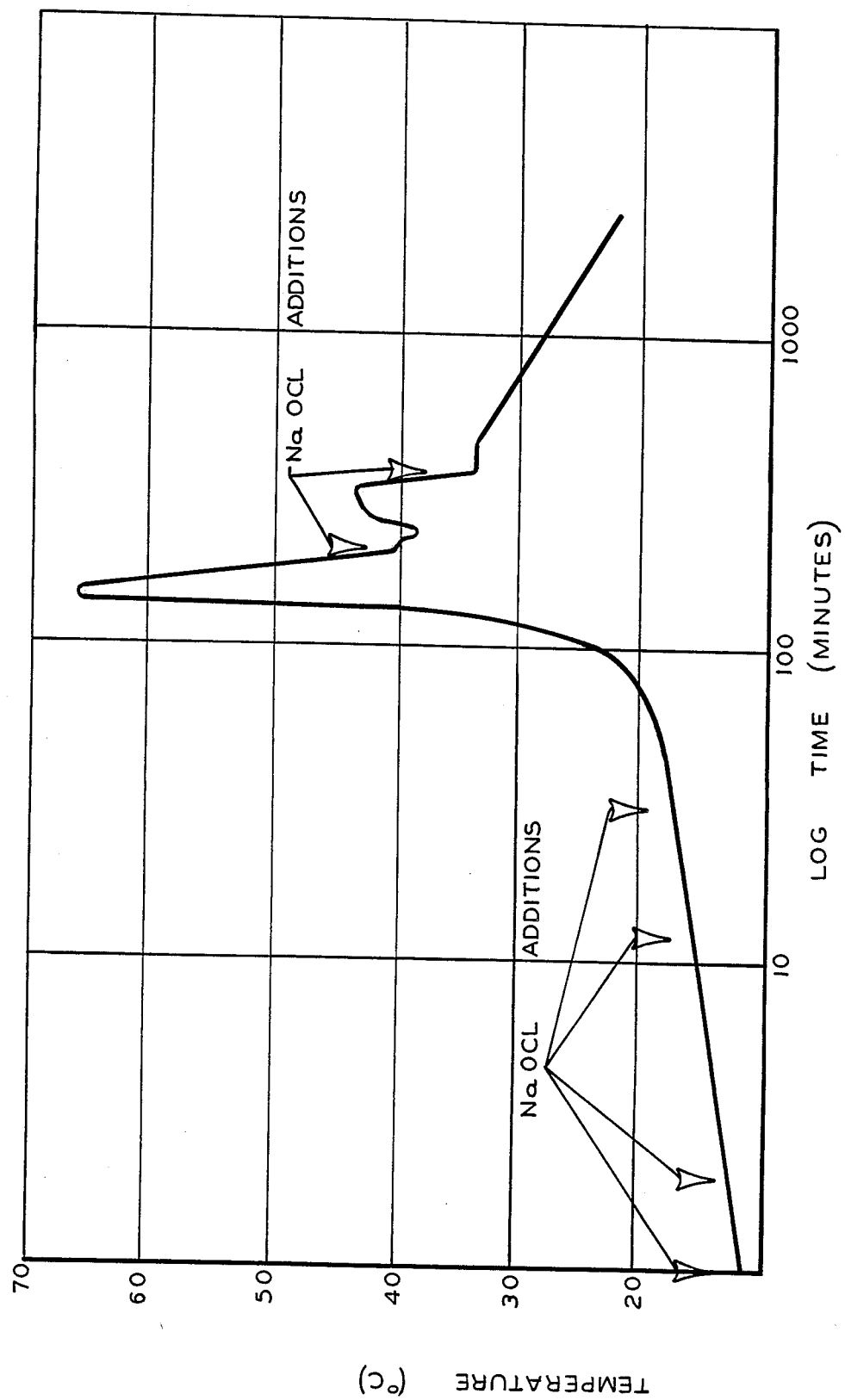

United States Patent [19]

Moskowitz

[11] Patent Number: 4,830,760
[45] Date of Patent: May 16, 1989

[54] TREATMENT OF IRON WASTE

[75] Inventor: Mark I. Moskowitz, Wayne, N.J.

[73] Assignee: GAF Corporation, Wayne, N.J.

[21] Appl. No.: 161,786

[22] Filed: Feb. 29, 1988

[51] Int. Cl.⁴ .............................................. C02F 11/06
[52] U.S. Cl. .................................... 210/752; 210/756; 210/758; 210/908
[58] Field of Search ............... 210/749, 752, 754, 753, 210/756, 758, 908, 912; 518/728

[56] References Cited

U.S. PATENT DOCUMENTS

| 3,373,180 | 3/1968 | Glass et al. | 568/917 |
| 3,433,841 | 3/1969 | Dehn et al. | 210/692 |
| 4,089,886 | 5/1978 | Branecky et al. | 568/915 |

FOREIGN PATENT DOCUMENTS 0094745 11/1983 European Pat. Off. ............ 210/749

Primary Examiner—Peter Hruskoci
Attorney, Agent, or Firm—Richard T. Laughlin; Anthony Lagani, Jr.; Joshua J. Ward

[57] ABSTRACT

Iron pentacarbonyl is removed from sludge containing iron particles by treating with surfactants followed by oxidation with hydrochlorite ion.

8 Claims, 1 Drawing Sheet

TREATMENT OF IRON WASTE

FIELD OF THE INVENTION

This invention relates to the treatment of waste material containing iron pentacarbonyl to render the iron pentacarbonyl non-hazardous.

BACKGROUND OF THE INVENTION

Because of environmental considerations, it is necessary to remove from waste materials traces of many chemicals. This can be done in some instances by physically removing the hazardous materials from the waste. This procedure makes it necessary to dispose of the toxic materials removed. The second, and preferred method, is by rendering such materials inactive by conversion of the materials to an acceptable, harmless form or composition.

The use of sodium hypochlorite to destroy iron pentacarbonyl is known where the iron pentacarbonyl is soluble in the media being used. U.S. Pat. No. 4,089,886 issued May 16, 1978 to Anthony J. Branecky discloses removing traces of iron pentacarbonyl from a methanol mixture with aqueous sodium hypochlorite. In a methanol mixture, the reaction is essentially one phase because of the solubility of small quantities of iron pentacarbonyl in such a mixture. It also has been suggested to use a solvent in such a process but such solvents create further problems because of the removal or disposal of the solvent. The use of ion exchange resins to remove iron pentacarbonyl is disclosed in U.S. Pat. No. 3,373,180 issued Mar. 12, 1968 to John Arnold Glass and Wilbert H. Urry and U.S. Pat. No. 3,433,841 issued Mar. 18, 1969 to John S. Dehn and John A. Glass.

THE OBJECTS OF THE INVENTION

It is an object of this invention to provide a method of removing hazardous materials from waste. It is another object of the invention to provide such a process for iron pentacarbonyl. A further object of the invention is to provide such a process which is economical and effective when the iron pentacarbonyl is present in large quantities. Other objects and the advantages of the invention will appear from the following detailed description.

THE DRAWING

FIG. 1 is a graph of a typical time-temperature profile of the process of the invention.

SUMMARY OF THE INVENTION

It has now been found that sludge compositions containing a substantial amount of iron pentacarbonyl which is substantially insoluble in the composition can be treated to render the iron pentacarbonyl non-hazardous. In this specification, the term non-hazardous means to reduce the concentration of iron pentacarbonyl below that which is allowed for normal waste disposal.

This is accomplished by the utilization of special surfactants to emulsify the iron pentacarbonyl in water followed by oxidation of the mixture to reduce the iron pentacarbonyl concentration to an acceptable level from an environmental standpoint.

The surfactant to be utilized can be selected from a range of compositions which will put the iron pentacarbonyl in suspension. The preferred surfactant is a mixture of a phosphate ester of alkylphenoxy polyoxyethylene ethanol and as a second surfactant a nonionic reaction product of an alkylphenol with ethylene oxide. The alkylphenol can be isooctylphenol, nonylphenol, dinonylphenol or a higher molecular weight alkylphenol. The mixture of surfactants is preferably in a one to one ratio but this can be varied from about 0.25 to about 4 parts of the phosphate ester per part of alkylphenol and ethylene oxide reaction product. A particularly effective surfactant is one to one mixture of a phosphate ester of the reaction product of dinonylphenol and seven moles of ethylene oxide, and the reaction product of nonylphenol and four moles of ethylene oxide.

The oxidation is accomplished by adding to the mixture a source of hypochlorite ions. The zero valent ion of the iron pentacarbonyl will react with the hypochlorite ions to convert the zero valent ion to a higher oxidation state. The source of the hypochlorite ions is not critical to the invention. The alkali metal hypochlorites or the alkaline earth metal hypochlorites are a suitable source of hypochlorite ions. As used in the specification, the term "alkali metal" means sodium, potassium, lithium and rubidium. The term "alkaline earth metal" means calcium, barium, strontium and magnesium. Specific compounds which can be utilized are sodium hypochlorite, calcium hypochlorite, potassium hypochlorite, lithium hypochlorite and barium hypochlorite.

It is preferred that a caustic solution be used to adjust the pH of the mixture to prevent the formation of hydrochloric acid. The process of the invention may be conducted batchwise or continuously, or a combination of the two.

The following examples are given to illustrate the present invention, but should not be construed as limiting the scope thereof.

EXAMPLE 1

A 7.5 gallon container of sludge of approximately 50% iron powder and 50% iron pentacarbonyl was decanted of the dark upper liquid layer and a sample of 0.5 gallons of the settled sludge was taken. This sample weighed 3631 grams.

A surfactant mix was prepared by adding to 40.5 lbs. of water following with constant agitation:
284 grams of GAFAC RM-410 (a phosphate ester of the reaction product of dinonylphenol and seven moles of ethylene oxide)
284 grams of Igepal CO-430 (the reaction product of nonylphenol and four moles of ethylene oxide)

About two gallons of this surfactant mixture was put in a 7.5 gallon container fitted with an air driven stirrer and a thermocouple. The sludge was added in farily large portions with the stirrer operating. The resulting mixture was a dark suspension. The stirring was continued for a period of 18 hours. The pH of the surfactant suspension after the 18 hour period was determined to be 7.8. Twenty milliliters of a 50% caustic was added bringing the mixture to a pH of 10.2.

The stirred surfactant-sludge suspension was treated with 10,635 grams of a 10% sodium hypochlorite. The sodium hypochlorite was added in four stages of approximately equal amounts over about 10 to 15 minutes. At each addition the temperature rose indicating a reaction was taking place. When no further rise in temperature was noted, another addition was made. Stirring was continued. Some small amounts of vapor were emitted which was carbon monoxide and water, with little foam formation. After two hours the temperature peaked at 66 C. When the temperature dropped to about 40 C. an additional 10 ml of 50% caustic was added and an additional 5,317 grams of 10% sodium hypochlorite, in two portions. A small temperature rise to about 43° C. was noted. After three additional hours of stirring, an additional 5,317 grams of 10% sodium hypochlorite was added with no temperature rise. Stirring was continued for an additional 18–19 hours.

The treated mix was allowed to settle and the supernatant liquid decanted from the settled reddish colored mixture. An analysis of the compositions showed the following:

|  | IPC Content | Flash point |
|---|---|---|
| Untreated sludge | 43,700 ppm | 70° F. |
| Supernatant (after treatment) | 0.5 ppm | 150° F. |
| Treated solid | 0.5 ppm | 150° F. |

A series of tests were run utilizing various quantities of study as indicated in Table I. The treatment tank was filled with water and a mixture of equal parts of GAFAC RM410 and IGEPAL CO430 were placed in the treatment tank. The sludge was pumped into the top of the treatment tank while recycling the surfactant solution for a period of approximately twelve hours. Sufficient caustic was then added with circulation to adjust the pH to 10. Sodium hypochlorite was then added to the tank as a rate of approximately 0.5 gallons per minute. The temperature of the mixture was monitored. The temperature desired is approximately 50° to 55° C. If the temperature is about 70° C., the bleach addition is discontinued. The mixture is recycled for an additional 12 hours. The composition is then pumped to a settling tank to allow the sludge to settle and the liquid decanted.

TABLE I

| Example | Water Gal | Sludge Gal. | GAFAC RM410 Gal. | IGEPAL CO430 Gal. | Caustic (l.) 20%/50% | Bleach Gal. |
|---|---|---|---|---|---|---|
| 2 | 70.5 | 20 | 1.03 | 1.08 | 6.7/1.40 | 58 |
| 3 | 88 | 25 | 1.30 | 1.32 | 8.45/1.75 | 72.5 |
| 4 | 106 | 30 | 1.54 | 1.60 | 10.00/2.10 | 87 |
| 5 | 123 | 35 | 1.80 | 1.90 | 12.00/2.45 | 102 |
| 6 | 141 | 40 | 2.13 | 2.20 | 13.50/2.80 | 116 |
| 7 | 158 | 45 | 2.30 | 2.40 | 15.00/3.15 | 131 |
| 8 | 176 | 50 | 2.58 | 2.70 | 17.00/3.50 | 145 |

From the foregoing description, various modifications and changes in the invention will occur to one skilled in the art. Such uses and modifications are intended to be included within the scope of the claims.

What is claimed is:

1. A method of treating a sludge containing water insoluble iron pentacarbonyl which comprises, emulsifying said iron pentacarbonyl with a surfactant and water to form a surfactant-sludge suspension containing said iron pentacarbonyl in suspension and oxidizing said suspension with an alkali metal hypohalide to reduce the amount of iron pentacarbonyl to acceptable environmental levels for waste disposal.

2. A method of treating a sludge containing water insoluble iron pentacarbonyl which comprises, emulsifying said iron pentacarbonyl with a surfactant and water to form a surfactant-sludge suspension containing said iron pentacarbonyl in suspension, wherein the surfactant is a combination of a phosphate ester of the reaction product of dinonylphenol and seven moles of ethylene oxide admixed with the reaction product of nonylphenol and four moles of ethylene oxide, and oxidizing said suspension with an alkali metal hypochlorite to reduce the amount of iron pentacarbonyl to acceptable environmental levels for waste disposal.

3. The method of claim 2 wherein the alkali metal hypochlorite is sodium hypochlorite.

4. The mixture of claim 3 wherein the sodium hypochlorite is added in stages to the iron pentacarbonyl sludge.

5. The method of claim 4 wherein the oxidation is carried out over a period of from about 2 to about 24 hours.

6. The method of claim 2 wherein the sludge contains iron powder.

7. The method of claim 6 wherein the iron powder is removed from the suspension after emulsifying iron pentacarbonyl.

8. The method of claim 6 wherein the sludge is agitated during oxidation.

* * * * *